UNITED STATES PATENT OFFICE.

KENNETH CRITTENDEN, OF DETROIT, MICHIGAN.

MOTOR-VEHICLE SUSPENSION.

1,046,273.

Specification of Letters Patent.

Patented Dec. 3, 1912.

Application filed July 12, 1910. Serial No. 571,550.

*To all whom it may concern:*

Be it known that I, KENNETH CRITTENDEN, a citizen of the United States of America, residing at Detroit, in the county of Wayne and State of Michigan, have invented certain new and useful Improvements in Motor-Vehicle Suspension, of which the following is a specification, reference being had therein to the accompanying drawings.

In spring suspension of an automobile chassis it is desirable that the chassis be given full clearance over the axles while kept as close to the latter as possible and that the chassis be as short as possible with a given wheel base in order to obtain rigidity and lightness of construction. This invention relates to automobile construction and more particularly to an arrangement of the rear axle and spring supporting the chassis whereby full clearance is obtained for the latter.

The invention consists in the matters hereinafter set forth, and more particularly pointed out in the appended claims.

Figure 1:
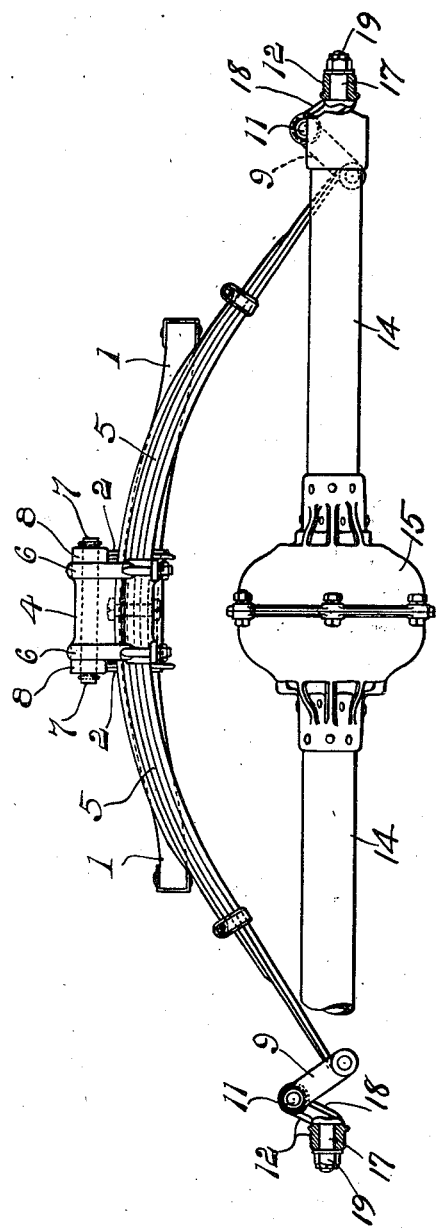
Figure 2:
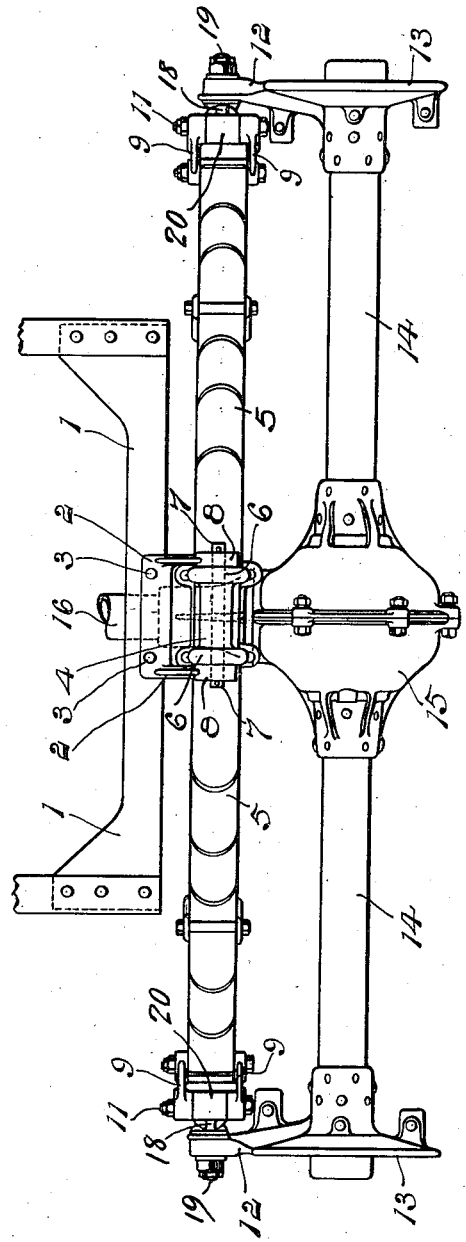

In the drawings, Figure 1 is a view in rear elevation, of the drive axle, spring and adjacent portion of the chassis of an automobile that embody features of the invention, the end portions of the axle being partially broken away and shown in section; and Fig. 2 is a plan view thereof.

Referring to the drawings 1 indicates the rear cross bar of a chassis frame which is centrally supported by a hanger 2 extending obliquely upward from the upper face of the bar to which it is fastened by rivets 3 or other suitable means. The upper end of the hanger rests on the center portion of an upwardly crowned semi-elliptic spring 5 to which it is pivotally secured by clips or U-bolts 6 whose arms embrace the spring and whose bodies are pivotally secured to the hanger by a pivot pin 7 passing through a pair of lugs 8 on the upper end of the hanger, the U-bolts being preferably coupled by a sleeve or yoke 4 which acts as a spacer to prevent their movement longitudinally of the spring.

The rear axle of conventional type comprising a gear casing 15 having a torsion rod 16 extending forwardly therefrom to a point of connection with the chassis, and tubular arms 14 extending laterally in each direction from said casing, are provided with forwardly extending brackets 12 formed integral with the usual end flanges 13 secured upon the ends of said tubular arms. The forward end of each bracket is formed with a bearing for the shank 17 of a pivot member 18 in which bearing said shank is free to turn upon an axis parallel with the axis of the axle and in which it is held by a nut 19 on the outer screwthreaded end of its shank. The outer ends of the spring 5 are pivotally supported in a pair of shackles 9 whose upper ends are pivotally attached to the members 18 by bolts 11 or the like passing through said shackles and through eyes 20 formed on the upwardly and inwardly extending heads or ends of said pivot members. The ends of the spring are thus articulated to the axle to extend freely under load in a direction longitudinally of the axle and to rotate upon an axis extending parallel with the axis of the axle. Upon flexure of the spring under load said spring is free to turn upon the pivot pin 7 and also upon the shanks 17 of the members 18 thus relieving the spring of all lateral strain which would be put upon it if rigidly secured against such rotation, as the chassis is forced by the torsion rod 16 to move longitudinally relative to the axle when the spring yields.

By this method of construction the chassis is given full clearance to oscillate freely above the axle with the same liberty of movement that is given the end spring body in an ordinary vehicle. Furthermore as the end of the chassis is well within the rear axle its side members are shorter than in the usual construction and as a consequence the construction may be very light and at the same time be rigid. The same ease of movement is obtained as by the side elliptic springs and rearwardly extending hangers common in automobiles, and with fewer parts and less liability of disarrangement.

Obviously changes in the details of construction may be made without departing from the spirit of the invention and I do not care to limit myself to any particular form or arrangement of parts.

What I claim as my invention is:—

1. In an automobile, the combination with a frame or chassis, of an axle having a gear casing intermediate its ends and brake drum flanges near its ends, forwardly extending brackets on the flanges provided with bearings, a semi-elliptic spring extending longitudinally of the axle, members engaging the bearings on the brackets to turn therein upon horizontal axes extending longitudinally of the axle, shackles connecting said members and the ends of said spring, and a member pivotally connecting said spring intermediate its ends and the chassis, having a pivotal axis extending parallel with the axes of the said members.

2. In an automobile, the combination with a frame or chassis, of an axle having a gear casing located back of the rear end of the chassis, a torsion rod extending forwardly from said axle to a point of connection with the chassis, a centrally disposed hanger extending rearwardly from the end of said chassis, brake drum flanges on the axle having forwardly extending brackets, and a semi-elliptic spring disposed in a plane parallel to and between the longitudinal vertical plane of the axle and the vertical plane of the rear end of the chassis, said springs being connected to said hanger by a pivot extending transversely of the chassis and articulated at its ends to said brackets to turn upon an axis parallel to the longitudinal axis of the axle.

3. In an automobile, the combination with a frame or chassis, an axle having a gear casing intermediate its ends and a torsion rod connecting the axle and chassis, of flanges on the ends of the axle formed with forwardly extending brackets having bearings at their outer ends, upwardly extending pivot members having shanks engaging said bearings to turn therein upon an axis extending longitudinally of the axle and each provided with an eye at its upper end, a semi-elliptic spring in the space between the chassis and axle, a horizontal pivot member pivotally connecting said spring intermediate its ends to the chassis in rear thereof to permit said spring to turn upon an axis parallel with the axes of the pivot members, and shackles pivotally attached to the ends of said springs and to said pivot members by means engaging the eyes of said members whereby said spring shall be free to oscillate in the space between the chassis and axle.

In testimony whereof I affix my signature in presence of two witnesses.

KENNETH CRITTENDEN.

Witnesses:
ANNA M. DORR,
OTTO F. BARTHEL.